United States Patent Office.

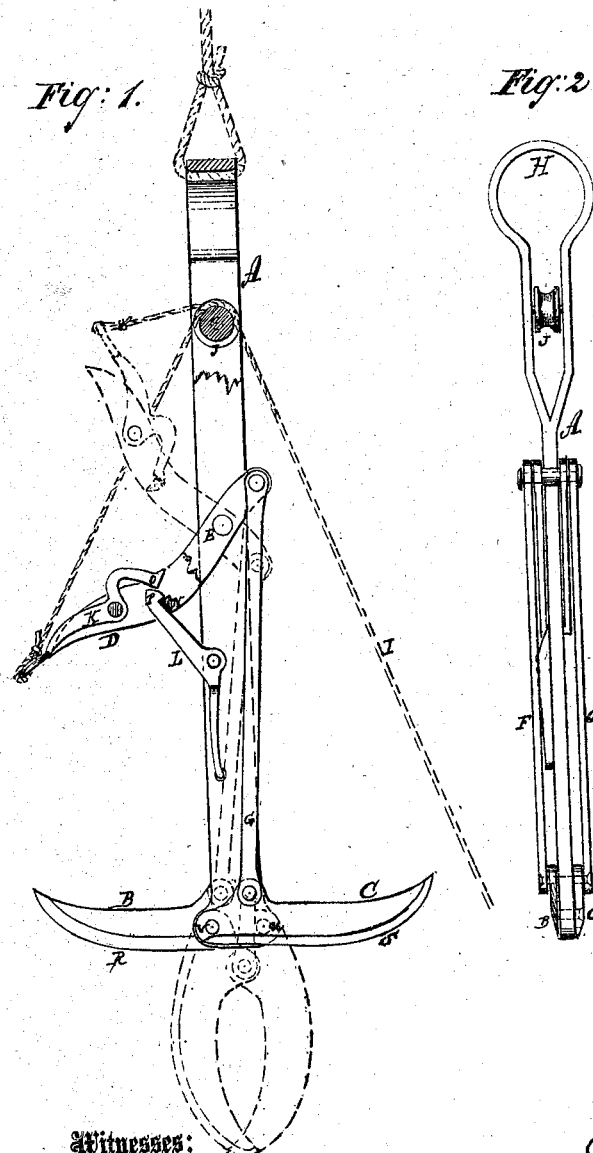

LEVERETT W. STUART, OF NARROWSBURG, NEW YORK.

Letters Patent No. 106,230, dated August 9, 1870.

IMPROVEMENT IN HORSE HAY-FORKS.

The Schedule referred to in these Letters Patent and making part of the same.

*To all whom it may concern:*

Be it known that I, LEVERETT W. STUART, of Narrowsburg, in the county of Sullivan and State of New York, have invented a new and useful Improvement in Combined Hay-Fork and Knife; and I do hereby declare that the following is a full, clear, and exact description thereof, which will enable others skilled in the art to make and use the same, reference being had to the accompanying drawing forming part of this specification.

This invention relates to a new and useful improvement in an implement for handling and cutting hay, it being a combined hay-fork and hay-knife, and consists in the construction, arrangement, and combination of parts hereinafter more fully described.

In the accompanying drawing—

Figure 1 is a side view; and

Figure 2 is an edge view of the combined hay-fork and hay-cutter.

Similar letters of reference indicate corresponding parts.

This implement consists of a main supporting-bar, A, two cutting-forks, B and C, attached by rivets or screws on the opposite sides of the bar, and connected with a double tripping-lever, D, (which has its fulcrum in the bar A,) at the point E, by the connecting-rods F and G, one of which rods, in fig. 1, is seen in dotted lines.

The implement is suspended from the loop H, by means of a rope, as seen in the drawing.

I is a cord, by means of which the lever D is tripped. This cord passes up over the pulley J, and is attached to the end of the dog K.

L is a spring catch, attached to the main bar A.

In using the implement for raising hay, the forks B C (closed together, as seen in dotted lines,) are thrust into the hay. The lever D is forced, from the position seen in dotted lines, down, so that the catch L engages with the stud N in the lever D. This movement spreads the forks beneath the hay, as seen in the drawing.

The catch I holds the lever down, so that the whole apparatus may be raised and the hay elevated to any desired height.

When the hay is in the right position for dumping, a jerk upon the cord I causes the end O of the dog K to strike the end P of the catch L, and force the catch from the stud N. When this is done, the forks drop into the position seen in dotted lines, and, of course, the hay slips off.

The outer edges R S of the forks are made sharp, so that they will cut when they are in the position seen in dotted lines, and thrust down into the hay.

When the forks are extended, as for raising hay, they are supported by the rods F G, attached to the forks, as seen in the drawing.

U is the pivot for the fork B, and

V the pivot for C.

By this arrangement, it will be seen, that the ends of the fork cross each other on opposite sides of the main bar A.

This is a most durable and effective implement for either raising or cutting hay, and its advantages will be readily understood by all.

Having thus described my invention,

I claim as new and desire to secure by Letters Patent—

The tripping device, composed of the dog K, spring catch L, and stud N, arranged and operating substantially as and for the purposes described, in combination with the lever E, and connecting-rod or rods, and the cutting-forks B C.

LEVERETT W. STUART.

Witnesses:
JOHN J. CORWIN,
WILLIAM EATON.